C. ELOESSER.
TRANSMISSION GEARING.
APPLICATION FILED MAR. 4, 1907.
1,140,890.
Patented May 25, 1915.
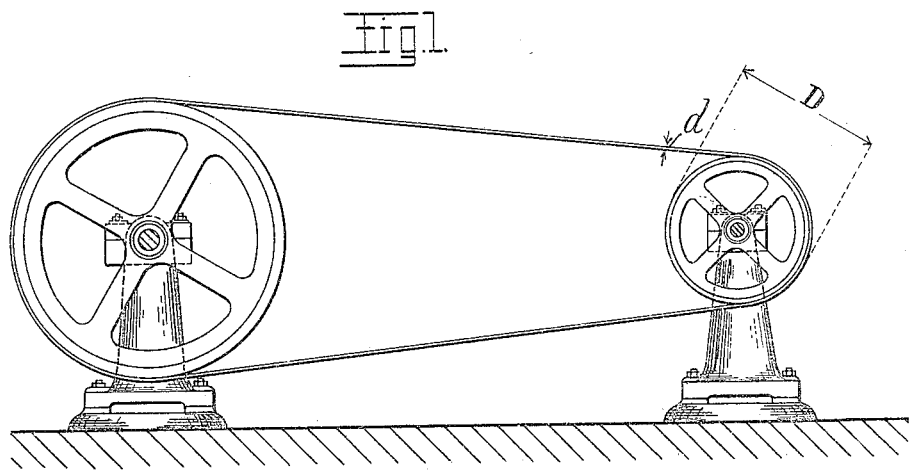
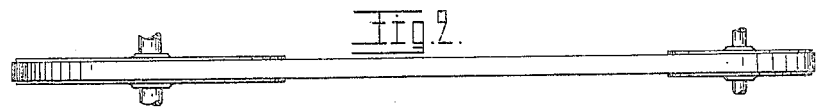
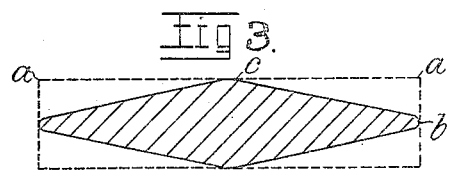
WITNESSES:
INVENTOR
Carl Eloesser
BY
ATTORNEYS.

UNITED STATES PATENT OFFICE.

CARL ELOESSER, OF CHARLOTTENBURG, GERMANY.

TRANSMISSION-GEARING.

1,140,890.  Specification of Letters Patent.  Patented May 25, 1915.

Application filed March 4, 1907. Serial No. 360,585.

*To all whom it may concern:*

Be it known that I, CARL ELOESSER, a subject of the King of Prussia, residing at 37 Hardenbergstrasse, Charlottenburg, Germany, have invented new and useful Improvements in Transmission - Gearing, of which the following is a specification.

The present invention relates to new transmission gearing for power purposes of the type in which a flexible tension element such as a belt, is wrapped around one or more pulleys and is carried forward by the friction of the surface of a pulley so as to transmit power to a second pulley or other organ. This type of gearing is employed for power transmission, for changing speed in machines of all kinds, in hoists, transporter contrivances and other devices.

The invention consists mainly in the employment of a new tension element and in the configuration thereof.

For the purpose of explaining the invention I have shown examples of a gearing and of various metal bands adapted for use in a gearing, in the accompanying drawing, in which—

Figure 1 is a side view of the gearing, Fig. 2 is a plan view thereof. Fig. 3 is a cross section of a band intended to overcome the injurious effect of the phenomenon heretofore explained.

As tension elements for power transmitting gearing of the above described type, only leather or woven belts or ropes have in general been previously employed; and according to the present invention, instead thereof, a smooth metal band is used composed for example of iron, steel, brass, tantalum and nickel alloys of suitable section which band is wrapped in tension around the pulleys.

The representation of a simple power transmission gearing with the above described tension element, as shown in Figs. 1 and 2 in side elevation and plan respectively, does not differ externally from the representation of an ordinary belt transmission contrivance.

The section of the metal band can be circular. This however will not be practicable for transmissions of large power, if same is to be effected by means of a single band, as corresponding with the above described proportions for bending stresses and the rules evolved therefrom, the thickness of the band depends principally on the diameter of the smallest pulley, while the breadth must depend on the power transmitted. Also with regard to the greater ease of construction for transmitting high powers a flat section is preferred like belts in general. It should be noted however that the section is not to be chosen merely with respect to the bending stresses which the band undergoes in use and with respect to the magnitude of the power to be transmitted. It should be observed that a flat metal band, if manufactured by rolling, other methods being almost inconceivable, is subjected to certain constructional defects, which, on the band being subjected to tension by unanticipated demands, may make themselves objectionably noticeable and might lead to the destruction of the band, although its section has been otherwise correctly calculated, as for example, a flat metal band will become displaced from cylindrical drums as a result of an otherwise unnoticeable deviation of the axes of the drums from being truly parallel, moreover, the band on leaving the drums assumes a slightly warped form, so that one edge of the band is somewhat shorter than the other. If the band is then subjected to tension, the other edge it is true will also bear, but in the material of the band unequal tensions will arise, the greater tension being along the shorter edge. The greater the power to be transmitted and the broader therefore the band, the greater will the difference in length between the two edges of the band become and the departure of the band from straightness on account of the inaccuracy of the drums. Should it be desired to take account of the before mentioned irregular demands in the usual manner, for the purpose of guarding against interruption, the bands must be made broader, in order to decrease the demand per unit of surface. The increase of breadth of the band would however bring about an increase in the difference of length of the edges of the band and the undesired inequalities of tension resulting therefrom. This method is therefore not practicable.

The effects of imperfections of rolling may be still further avoided by employing a special section, by reducing the lateral borders of the band or rounding their edges. As above set forth, the greatest tension due to imperfection of rolling occurs at the shorter edge of the band, also the maximum flexure stress occurs at the outer surface of the band, therefore the maximum stress due to the combined effect will occur at the sharp edge a, as shown in Fig. 3 of the band, so that a fracture may easily develop at this sharp edge. If the borders are thinned or the edges rounded, as shown in Fig. 3, on the one hand no considerable bending stress will occur at the edge b and on the other hand at the upper surface c, where the greatest bending stress periodically occurs, no additional tension can result from errors of rolling. This reduction or rounding of the section of the band is most conveniently attained by a drawing process. The subdivision and rounding of the edges can be carried so far, that a circular section is imparted to the individual band strips, so that instead of a broad flat band a series of adjacently situated round wires (e. g. piano-wires), can be employed.

I claim.

A power transmission-belt, comprising a relatively broad endless metal band the cross-section of which is greatest at the middle of the band and tapering off to a thin rounded edge at each side.

In witness whereof I have hereunto signed my name this 14th day of February 1907, in the presence of two subscribing witnesses.

CARL ELOESSER.

Witnesses:
 WOLDEMAR HAUPT,
 HENRY HASPER.